US012769713B2

(12) United States Patent
Rossillo et al.

(10) Patent No.: US 12,769,713 B2
(45) Date of Patent: Oct. 20, 2026

(54) AUTOMATED PROBLEM TRIAGE USING ARTIFICIAL INTELLIGENCE SYSTEMS

(71) Applicant: International Business Machines Corporation, Armonk, NY (US)

(72) Inventors: Dominic Rossillo, Highland, NY (US); Michael Terrence Cohoon, Fishkill, NY (US); James A O'Connor, Ulster Park, NY (US); Steven Lafalce, Salt Point, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 18/981,462

(22) Filed: Dec. 14, 2024

(65) Prior Publication Data

US 2026/0169963 A1 Jun. 18, 2026

(51) Int. Cl.
*G06F 16/215* (2019.01)
*G06F 16/21* (2019.01)
*G06F 16/22* (2019.01)

(52) U.S. Cl.
CPC .......... *G06F 16/215* (2019.01); *G06F 16/219* (2019.01); *G06F 16/2237* (2019.01)

(58) Field of Classification Search
CPC ... G06F 16/215; G06F 16/219; G06F 16/2237
See application file for complete search history.

(56) References Cited

U.S. PATENT DOCUMENTS 7,836,346 B1 * 11/2010 Davidov ............. G06F 11/3692
717/124
9,122,803 B1 * 9/2015 Michelsen .......... G06F 11/3684
(Continued)

FOREIGN PATENT DOCUMENTS

CN 109165382 A * 1/2019 ............. G06F 40/30
CN 115330243 A 11/2022
(Continued)

OTHER PUBLICATIONS

CN 109165382 A—translated (Year: 2019).*
(Continued)

*Primary Examiner* — Maher N Algibhah
(74) *Attorney, Agent, or Firm* — Seed Intellectual Property Law Group LLP

(57) ABSTRACT

A search is conducted to identify database defect reports describing similar defects to a proposed defect description. The proposed defect description is analyzed to determine whether the proposed defect description includes an amount of information sufficient to describe a corresponding problem based on historical defect data. A synthetic updated defect description is generated based on the latest updated defect description or the proposed defect description in response to the latest updated defect description or the proposed defect description not including a sufficient amount of information. An evaluation to identify high-level content differences between the synthetic updated defect description and one of the latest updated defect description and the proposed defect description is performed. Prompts describing suggestions of additional information to provide in the final defect report are generated based on the high-level content differences. A user is prompted to update the proposed defect description or the latest updated defect description.

24 Claims, 4 Drawing Sheets

(56) References Cited

U.S. PATENT DOCUMENTS

| | | | | |
|---|---|---|---|---|
| 9,244,510 | B1 * | 1/2016 | Conrad | G06F 11/30 |
| 9,508,062 | B2 | 11/2016 | Harris et al. | |
| 12,229,756 | B2 * | 2/2025 | Peterson | H04L 9/3226 |
| 2006/0156077 | A1 * | 7/2006 | Altaf | G06F 11/0775 714/57 |
| 2007/0168343 | A1 * | 7/2007 | Best | G06F 16/334 707/999.005 |
| 2007/0266149 | A1 * | 11/2007 | Cobb | H04L 41/5083 709/224 |
| 2010/0031095 | A1 * | 2/2010 | Ruan | G06Q 10/06 714/57 |
| 2013/0173041 | A1 * | 7/2013 | Leu | G06Q 10/06395 700/105 |
| 2014/0143399 | A1 * | 5/2014 | Kinomoto | G06F 11/0733 709/223 |
| 2014/0201573 | A1 * | 7/2014 | Huang | G06F 11/0721 714/38.1 |
| 2014/0267691 | A1 * | 9/2014 | Humphrey | G06T 7/001 348/125 |
| 2022/0180290 | A1 * | 6/2022 | Xin | G06N 3/04 |
| 2023/0185835 | A1 | 6/2023 | Malviya et al. | |

FOREIGN PATENT DOCUMENTS

| | | | | |
|---|---|---|---|---|
| CN | 117332066 | A | 1/2024 | |
| CN | 118036721 | A | 5/2024 | |
| CN | 118114098 | A * | 5/2024 | G06F 40/289 |
| CN | 118245580 | A | 6/2024 | |
| CN | 118349661 | A | 7/2024 | |
| CN | 118484526 | A | 8/2024 | |
| CN | 119046156 | A * | 11/2024 | G06F 16/35 |
| CN | 120670306 | A * | 9/2025 | |

OTHER PUBLICATIONS

Betz et al., “Thinking Aloud: Dynamic Context Generation Improves Zero-Shot Reasoning Performance of GPT-2”, arXiv preprint arXiv:2103.13033, 2021, 17 Pages.

IBM, “What is MongoDB?”, retrieved https://www.ibm.com/topics/mongodb, dated Feb. 6, 2025, 9 pages.

* cited by examiner

AUTOMATED PROBLEM TRIAGE USING ARTIFICIAL INTELLIGENCE SYSTEMS

BACKGROUND

The present invention relates generally to the electrical, electronic and computer arts and, more particularly, to software and hardware testing, and machine learning.

In conventional defect management solutions and test processes, potential flaws in recognizing defects that have already been seen and reported in open defect records may exist in the system. When these duplicate defects are created, developers typically need to manually review the duplicate defect as if it were a new valid defect until they can determine that the defect is indeed a duplicate of an existing defect record.

BRIEF SUMMARY

Principles of the invention provide techniques for automated problem triage using artificial intelligence (AI) systems. In one aspect, an exemplary method includes the operations of obtaining a proposed defect description; conducting a search to identify one or more database defect reports describing similar defects recorded in a database; performing a check to determine if a similar defect report having a similarity above a given similarity threshold is found; and creating a final defect report based on a latest updated defect report in response to the latest updated defect report being unique.

In one aspect, a method comprises obtaining a proposed defect description; conducting a search to identify one or more database defect reports describing similar defects recorded in a database; analyzing the proposed defect description to determine whether the proposed defect description includes an amount of information sufficient to describe a corresponding problem based on historical defect data; performing a check to determine if the proposed defect description includes a sufficient amount of information based on the historical defect data, wherein the conducting of the search is performed based on a result of the check; generating a synthetic updated defect description based on a latest updated defect description or the proposed defect description in response to the latest updated defect description or the proposed defect description not including a sufficient amount of information; performing an evaluation to identify one or more high-level content differences between the synthetic updated defect description and one of the latest updated defect description and the proposed defect description; generating prompts describing suggestions of additional information to provide in a final defect report based on the one or more high-level content differences; and prompting a user to perform an updating of the proposed defect description or the latest updated defect description.

In one aspect, a system comprises a memory and at least one processor, coupled to the memory, and operative to perform operations comprising obtaining a proposed defect description; conducting a search to identify one or more database defect reports describing similar defects recorded in a database; performing a check to determine if a similar defect report having a similarity above a given similarity threshold is found; and creating a final defect report based on a latest updated defect report in response to the latest updated defect report being unique.

In one aspect, a computer program product comprises one or more tangible computer-readable storage media and program instructions stored on at least one of the one or more tangible computer-readable storage media, the program instructions executable by a processor, the program instructions comprising obtaining a proposed defect description; conducting a search to identify one or more database defect reports describing similar defects recorded in a database; analyzing the proposed defect description to determine whether the proposed defect description includes an amount of information sufficient to describe a corresponding problem based on historical defect data; performing a check to determine if the proposed defect description includes a sufficient amount of information based on the historical defect data, wherein the conducting the search is performed based on a result of the check; generating a synthetic updated defect description based on a latest updated defect description or the proposed defect description in response to the latest updated defect description or the proposed defect description not including a sufficient amount of information; performing an evaluation to identify one or more high-level content differences between the synthetic updated defect description and one of the latest updated defect description and the proposed defect description; generating prompts describing suggestions of additional information to provide in a final defect report based on the one or more high-level content differences; and prompting a user to perform an updating of the proposed defect description or the latest updated defect description.

In one aspect, a system comprises a memory and at least one processor, coupled to the memory, and operative to perform operations comprising obtaining a proposed defect description; conducting a search to identify one or more database defect reports describing similar defects recorded in a database; analyzing the proposed defect description to determine whether the proposed defect description includes an amount of information sufficient to describe a corresponding problem based on historical defect data; performing a check to determine if the proposed defect description includes a sufficient amount of information based on the historical defect data, wherein the conducting the search is performed based on a result of the check; generating a synthetic updated defect description based on a latest updated defect description or the proposed defect description in response to the latest updated defect description or the proposed defect description not including a sufficient amount of information; performing an evaluation to identify one or more high-level content differences between the synthetic updated defect description and one of the latest updated defect description and the proposed defect description; generating prompts describing suggestions of additional information to provide in a final defect report based on the one or more high-level content differences; and prompting a user to perform an updating of the proposed defect description or the latest updated defect description.

As used herein, "facilitating" an action includes performing the action, making the action easier, helping to carry the action out, or causing the action to be performed. Thus, by way of example and not limitation, instructions executing on a processor might facilitate an action carried out by instructions executing on a remote processor, by sending appropriate data or commands to cause or aid the action to be performed. Where an actor facilitates an action other than by performing the action, the action is nevertheless performed by some entity or combination of entities.

Techniques as disclosed herein can provide substantial beneficial technical effects, as will be discussed further below. Features and advantages will become apparent from the following detailed description of illustrative embodiments thereof, which is to be read in connection with the accompanying drawings.

BRIEF DESCRIPTION OF THE DRAWINGS

The following drawings are presented by way of example only and without limitation, wherein like reference numerals (when used) indicate corresponding elements throughout the several views, and wherein.

Figure 1:
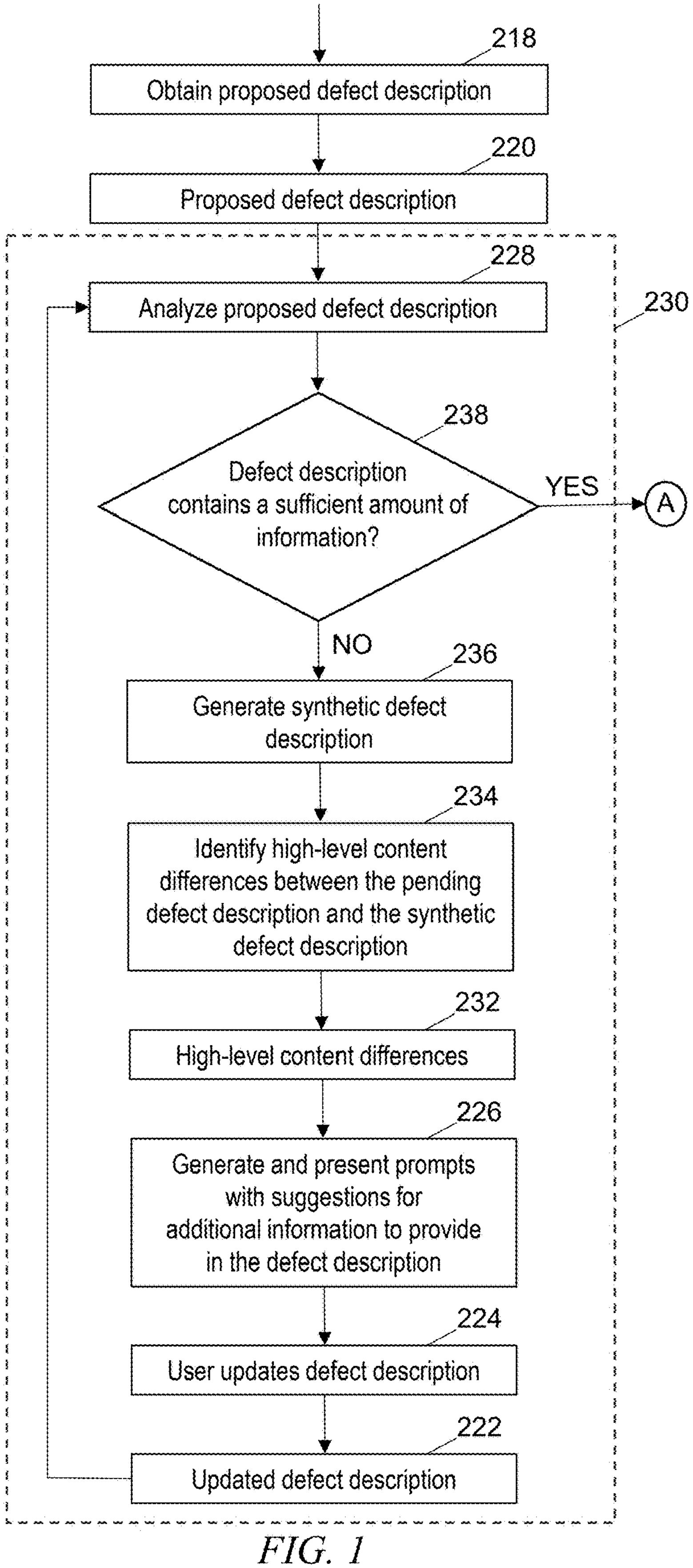
FIG. 1 is an example workflow for generating a description of a defect report, in accordance with example embodiments.
Figure 1:
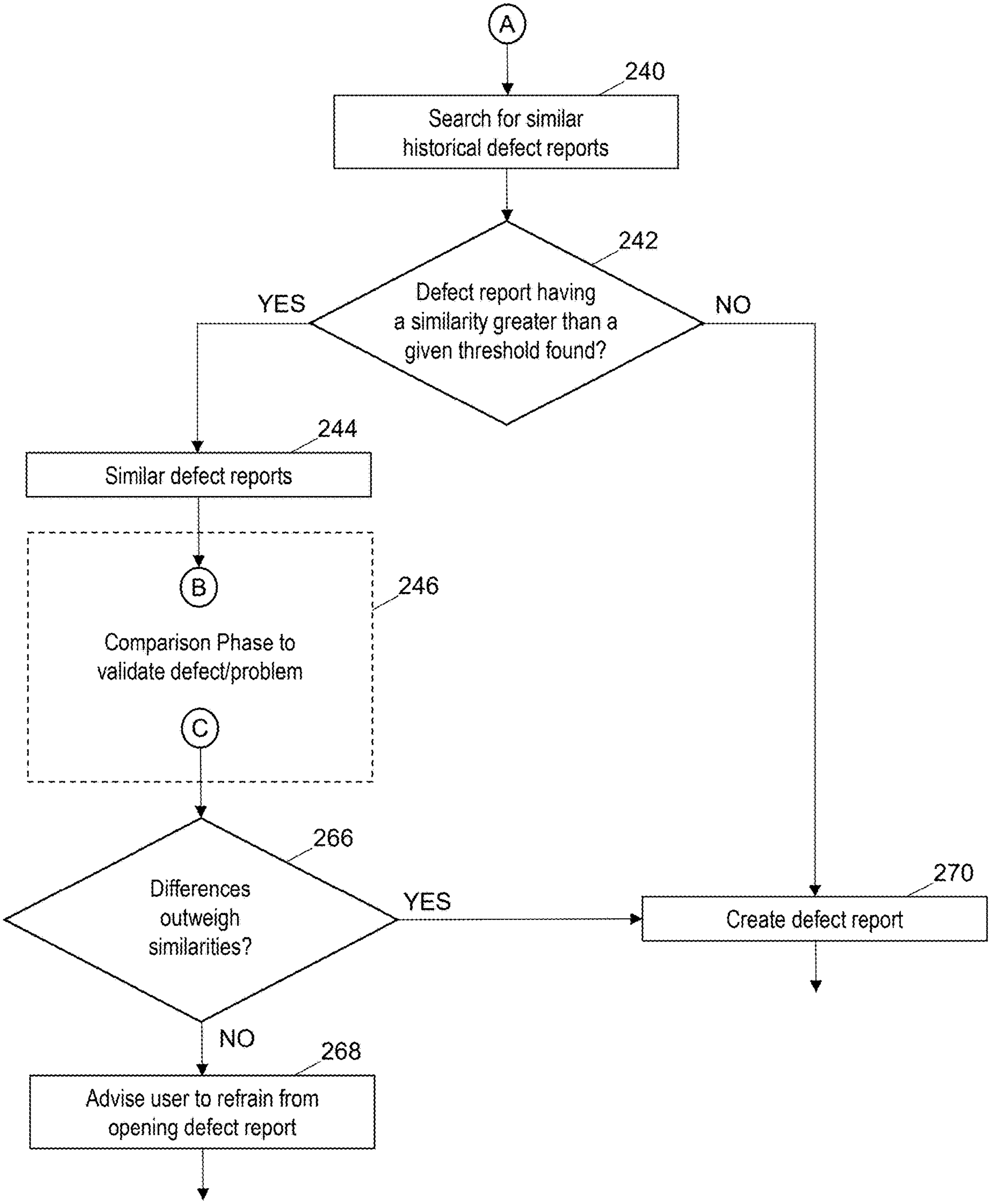
Figure 1:
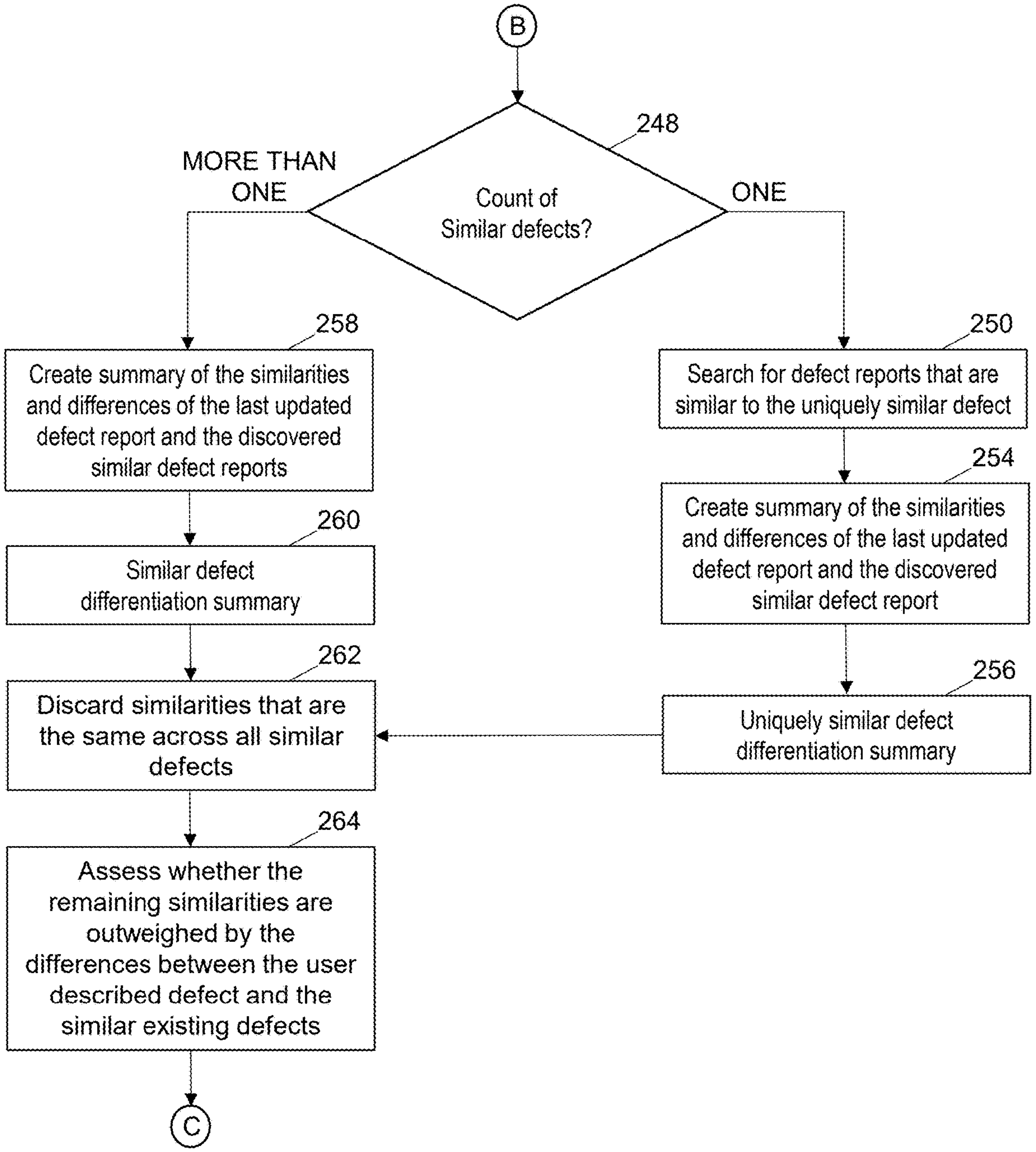

It is to be appreciated that elements in the figures are illustrated for simplicity and clarity. Common but well-understood elements that may be useful or necessary in a commercially feasible embodiment may not be shown in order to facilitate a less hindered view of the illustrated embodiments.

DETAILED DESCRIPTION

Principles of inventions described herein will be in the context of illustrative embodiments. Moreover, it will become apparent to those skilled in the art given the teachings herein that numerous modifications can be made to the embodiments shown that are within the scope of the claims. That is, no limitations with respect to the embodiments shown and described herein are intended or should be inferred.

Given the discussion herein (reference characters refer to the drawings discussed below), in aspects of the invention a method comprises obtaining a proposed defect description 220 (operation 218); conducting a search to identify one or more database defect reports describing similar defects recorded in a database (operation 240); performing a check to determine if a similar defect report having a similarity above a given similarity threshold is found (decision block 242); and creating a final defect report based on a latest updated defect report (operation 270) in response to the latest updated defect report being unique (NO branch of decision block 242). Technical benefits include automated techniques for assessing defect reports using historical data and improving the quality of each defect report and the corresponding description; an automated multi-stage problem triage process in which information provided by a user regarding a given problem is analyzed, refined and compared against a corpus of existing problem (defect) records to ensure content completeness of the defect description, problem validity and uniqueness of user input problems; reduction in the human and machine resources and wasted time resulting from duplicate reports of existing technical problems, problem descriptions that lack relevant information, problem descriptions containing errors (including those resulting from human error) and the like; improvements to the process of software and hardware testing and development; automated process for identifying duplicate problems, thereby increasing the processing speed and efficiency of a defect triage process; tools for enabling testers to produce better problem descriptions using log data that enables developers to more quickly understand and resolve real problems, increasing the effectiveness and quality of defect resolution; tools for automatically reviewing problem descriptions and providing recommendations to improve problem descriptions and improve the overall quality of defect resolution; facilitation of the reduction of the quantity of historic data that needs to be maintained for the future in a multi-stage problem triage process; and reduction in the need for human resources and the corresponding machine resources by eliminating the need for human intervention in numerous technical problem resolutions.

In example embodiments, the search is a vector database search. The technical benefits include an improved technique for conducting a search to identify the database defect report(s).

In example embodiments, a content completeness phase 230 is conducted, wherein the conducting the search to identify the defect reports is based on a latest updated defect description 222 generated by the content completeness phase 230. The technical benefits include ensuring that the final defect report is complete.

In example embodiments, a check is performed to determine a count of similar defects (decision block 248) in response to finding the similar defect report having the similarity above the given similarity threshold during a subsequent iteration of the method (YES branch of decision block 242). The technical benefits include determining a degree of uniqueness of the defect report.

In example embodiments, a defect differentiation summary 260 of similarities and differences of the latest updated defect report and the discovered similar defect reports (operation 258) is created and the defect differentiation summary 260 is provided to a user in response to the count of similar defects being greater than one (MORE THAN ONE branch of decision block 248). The technical benefits include a technique for guiding a user to improve the defect report.

In example embodiments, the similarities are assessed, a set of the similarities that are included in all of the discovered similar defect reports is discarded and a validity of the latest updated defect report is identified (operation 262). The technical benefits include discarding the similarities that are not useful in determining a uniqueness of the defect report.

In example embodiments, remaining similarities and differences are assessed based on a statistical model in response to the assessing the similarities (operation 264). The technical benefits include evaluating the relevance of features in determining a uniqueness of the defect report.

In example embodiments, whether remaining similarities are outweighed by the differences between the latest updated defect report and the similar database defect reports are assessed in response to the assessing the similarities (operation 264); and a check is performed to determine if the differences outweigh the similarities (decision block 266). The technical benefits include determining if the differences are sufficient to determine that the defect report is unique.

In example embodiments, the defect report is created in response to the differences outweighing the similarities (YES branch of decision block 266) (operation 270). The technical benefits include generating a final defect report in response to determining that the defect report is unique.

In example embodiments, a user is advised to refrain from opening the defect report in response to the similarities outweighing the differences (NO branch of decision block 266) (operation 268). The technical benefits include preventing a duplicate defect report from being issued.

In example embodiments, a portion of information describing the similarities and the differences is provided to the user. The technical benefits include informing the user of issues related to the validity of the defect report.

In example embodiments, a search is conducted to identify given defect reports of the database defect reports that describe defects similar to the single similar defect, in response to the count of similar defects being equal to one (ONE branch of decision block 248; operation 250). The technical benefits include identifying additional defect reports similar to the identified single similar defect.

In example embodiments, the search to identify defect reports that describe defects similar to the single similar defect is based on a specified time frame. The technical benefits include identifying defect reports based on a specified time frame.

In example embodiments, a summary of the similarities and differences of the latest updated defect report and the discovered single similar defect report is created (operation 254) and the summary is provided to a user as a uniquely similar defect differentiation summary 256. The technical benefits include informing the user of the potential uniqueness of the defect report.

In example embodiments, the proposed defect description 220 is analyzed to determine whether the proposed defect description 220 includes an amount of information sufficient to describe a corresponding problem based on historical defect data (operation 228); and a check is performed to determine if the proposed defect description 220 includes a sufficient amount of information based on the historical defect data (completeness; decision block 238), wherein the conducting the search is performed based on a result of the check. The technical benefits include determining whether the defect report includes a sufficient amount of descriptive information.

In example embodiments, an amount of information is sufficient to describe a corresponding problem when all relevant system components are included. The technical benefits include providing a threshold for determining when the amount of descriptive information in a defect report is sufficient.

In example embodiments, a synthetic updated defect description is generated based on the latest updated defect description 222 or the proposed defect description 220 in response to the latest updated defect description 222 or the proposed defect description 220 not including a sufficient amount of information (NO branch of decision block 238; operation 236); an evaluation is performed to identify one or more high-level content differences 232 between the synthetic updated defect description and one of the latest updated defect description 222 and the proposed defect description 220 (operation 234); prompts describing suggestions of additional information to provide in the final defect report is generated based on the one or more high-level content differences 232 (operation 226); and a user is prompted to perform an updating of the proposed defect description 220 or the latest updated defect description (operation 226). The technical benefits include the artificial generation of a synthetic defect description and the prompting of a user to improve the defect description.

In example embodiments, the iterative loop of the content completeness phase 230 is repeated until the latest updated defect description 222 is considered complete or the user has added all available, relevant information. The technical benefits include iteratively improving the defect report.

In one aspect, a method comprises obtaining a proposed defect description 220 (operation 218); conducting a search to identify one or more database defect reports describing similar defects recorded in a database (operation 240); analyzing the proposed defect description 220 to determine whether the proposed defect description 220 includes an amount of information sufficient to describe a corresponding problem based on historical defect data (operation 228); performing a check to determine if the proposed defect description 220 includes a sufficient amount of information based on the historical defect data (completeness; decision block 238), wherein the conducting of the search is performed based on a result of the check; generating a synthetic updated defect description based on a latest updated defect description 222 or the proposed defect description 220 in response to the latest updated defect description 222 or the proposed defect description 220 not including a sufficient amount of information (NO branch of decision block 238; operation 236); performing an evaluation to identify one or more high-level content differences 232 between the synthetic updated defect description and one of the latest updated defect description 222 and the proposed defect description 220 (operation 234); generating prompts describing suggestions of additional information to provide in a final defect report based on the one or more high-level content differences 232 (operation 226); and prompting a user to perform an updating of the proposed defect description 220 or the latest updated defect description (operation 226). Technical benefits include automated techniques for assessing defect reports using historical data and improving the quality of each defect report and the corresponding description; an automated multi-stage problem triage process in which information provided by a user regarding a given problem is analyzed, refined and compared against a corpus of existing problem (defect) records to ensure content completeness of the defect description, problem validity and uniqueness of user input problems; reduction in the human and machine resources and wasted time resulting from duplicate reports of existing technical problems, problem descriptions that lack relevant information, problem descriptions containing errors (including those resulting from human error) and the like; improvements to the process of software and hardware testing and development; automated process for identifying duplicate problems, thereby increasing the processing speed and efficiency of a defect triage process; tools for enabling testers to produce better problem descriptions using log data that enables developers to more quickly understand and resolve real problems, increasing the effectiveness and quality of defect resolution; tools for automatically reviewing problem descriptions and providing recommendations to improve problem descriptions and improve the overall quality of defect resolution; facilitation of the reduction of the quantity of historic data that needs to be maintained for the future in a multi-stage problem triage process; and reduction in the need for human resources and the corresponding machine resources by eliminating the need for human intervention in numerous technical problem resolutions.

In example embodiments, an updated defect description is obtained (operation 224); and the analyzing the proposed defect description 220 is repeated to determine whether the proposed defect description 220 includes the amount of information sufficient to describe the corresponding problem based on the historical defect data (operation 228). The technical benefits include the iterative analysis of the proposed defect description 220 to determine whether the proposed defect description 220 includes an amount of information sufficient to describe the corresponding problem based on the historical defect data.

In one aspect, a system comprises a memory and at least one processor, coupled to the memory, and operative to perform operations comprising obtaining a proposed defect description 220 (operation 218); conducting a search to identify one or more database defect reports describing similar defects recorded in a database (operation 240);

performing a check to determine if a similar defect report having a similarity above a given similarity threshold is found (decision block 242); and creating a final defect report based on a latest updated defect report (operation 270) in response to the latest updated defect report being unique (NO branch of decision block 242). Technical benefits include automated techniques for assessing defect reports using historical data and improving the quality of each defect report and the corresponding description; an automated multi-stage problem triage process in which information provided by a user regarding a given problem is analyzed, refined and compared against a corpus of existing problem (defect) records to ensure content completeness of the defect description, problem validity and uniqueness of user input problems; reduction in the human and machine resources and wasted time resulting from duplicate reports of existing technical problems, problem descriptions that lack relevant information, problem descriptions containing errors (including those resulting from human error) and the like; improvements to the process of software and hardware testing and development; automated process for identifying duplicate problems, thereby increasing the processing speed and efficiency of a defect triage process; tools for enabling testers to produce better problem descriptions using log data that enables developers to more quickly understand and resolve real problems, increasing the effectiveness and quality of defect resolution; tools for automatically reviewing problem descriptions and providing recommendations to improve problem descriptions and improve the overall quality of defect resolution; facilitation of the reduction of the quantity of historic data that needs to be maintained for the future in a multi-stage problem triage process; and reduction in the need for human resources and the corresponding machine resources by eliminating the need for human intervention in numerous technical problem resolutions.

In one aspect, a computer program product comprises one or more tangible computer-readable storage media and program instructions stored on at least one of the one or more tangible computer-readable storage media, the program instructions executable by a processor, the program instructions comprising obtaining a proposed defect description 220 (operation 218); conducting a search to identify one or more database defect reports describing similar defects recorded in a database (operation 240); analyzing the proposed defect description 220 to determine whether the proposed defect description 220 includes an amount of information sufficient to describe a corresponding problem based on historical defect data (operation 228); performing a check to determine if the proposed defect description 220 includes a sufficient amount of information based on the historical defect data (completeness; decision block 238), wherein the conducting the search is performed based on a result of the check; generating a synthetic updated defect description based on a latest updated defect description 222 or the proposed defect description 220 in response to the latest updated defect description 222 or the proposed defect description 220 not including a sufficient amount of information (NO branch of decision block 238; operation 236); performing an evaluation to identify one or more high-level content differences 232 between the synthetic updated defect description and one of the latest updated defect description 222 and the proposed defect description 220 (operation 234); generating prompts describing suggestions of additional information to provide in a final defect report based on the one or more high-level content differences 232 (operation 226); and prompting a user to perform an updating of the proposed defect description 220 or the latest updated defect description (operation 226). Technical benefits include automated techniques for assessing defect reports using historical data and improving the quality of each defect report and the corresponding description; an automated multi-stage problem triage process in which information provided by a user regarding a given problem is analyzed, refined and compared against a corpus of existing problem (defect) records to ensure content completeness of the defect description, problem validity and uniqueness of user input problems; reduction in the human and machine resources and wasted time resulting from duplicate reports of existing technical problems, problem descriptions that lack relevant information, problem descriptions containing errors (including those resulting from human error) and the like; improvements to the process of software and hardware testing and development; automated process for identifying duplicate problems, thereby increasing the processing speed and efficiency of a defect triage process; tools for enabling testers to produce better problem descriptions using log data that enables developers to more quickly understand and resolve real problems, increasing the effectiveness and quality of defect resolution; tools for automatically reviewing problem descriptions and providing recommendations to improve problem descriptions and improve the overall quality of defect resolution; facilitation of the reduction of the quantity of historic data that needs to be maintained for the future in a multi-stage problem triage process; and reduction in the need for human resources and the corresponding machine resources by eliminating the need for human intervention in numerous technical problem resolutions.

In one aspect, a system comprises a memory and at least one processor, coupled to the memory, and operative to perform operations comprising obtaining a proposed defect description 220 (operation 218); conducting a search to identify one or more database defect reports describing similar defects recorded in a database (operation 240); analyzing the proposed defect description 220 to determine whether the proposed defect description 220 includes an amount of information sufficient to describe a corresponding problem based on historical defect data (operation 228); performing a check to determine if the proposed defect description 220 includes a sufficient amount of information based on the historical defect data (completeness; decision block 238), wherein the conducting the search is performed based on a result of the check; generating a synthetic updated defect description based on a latest updated defect description 222 or the proposed defect description 220 in response to the latest updated defect description 222 or the proposed defect description 220 not including a sufficient amount of information (NO branch of decision block 238; operation 236); performing an evaluation to identify one or more high-level content differences 232 between the synthetic updated defect description and one of the latest updated defect description 222 and the proposed defect description 220 (operation 234); generating prompts describing suggestions of additional information to provide in a final defect report based on the one or more high-level content differences 232 (operation 226); and prompting a user to perform an updating of the proposed defect description 220 or the latest updated defect description (operation 226). Technical benefits include automated techniques for assessing defect reports using historical data and improving the quality of each defect report and the corresponding description; an automated multi-stage problem triage process in which information provided by a user regarding a given problem is analyzed, refined and compared against a corpus of existing problem (defect) records to ensure content completeness of the defect description, problem validity and uniqueness of user input problems; reduction in the human and machine resources and wasted time resulting from duplicate reports of existing technical problems, problem descriptions that lack relevant information, problem descriptions containing errors (including those resulting from human error) and the like; improvements to the process of software and hardware testing and development; automated process for identifying duplicate problems, thereby increasing the processing speed and efficiency of a defect triage process; tools for enabling testers to produce better problem descriptions using log data that enables developers to more quickly understand and resolve real problems, increasing the effectiveness and quality of defect resolution; tools for automatically reviewing problem descriptions and providing recommendations to improve problem descriptions and improve the overall quality of defect resolution; facilitation of the reduction of the quantity of historic data that needs to be maintained for the future in a multi-stage problem triage process; and reduction in the need for human resources and the corresponding machine resources by eliminating the need for human intervention in numerous technical problem resolutions.

In example embodiments, a content completeness phase 230 is conducted, wherein the conducting the search to identify the defect reports is based on a latest updated defect description 222 generated by the content completeness phase 230. The technical benefits include ensuring that the final defect report is complete.

In example embodiments, a check is performed to determine a count of similar defects (decision block 248) in response to finding the similar defect report having the similarity above the given similarity threshold during a subsequent iteration of the method (YES branch of decision block 242). The technical benefits include determining a degree of uniqueness of the defect report.

By way of example only and without limitation, one or more embodiments may provide one or more of:

- automated techniques for assessing defect reports using historical data and improving the quality of each defect report and the corresponding description;
- an automated multi-stage problem triage process in which information provided by a user regarding a given problem is analyzed, refined and compared against a corpus of existing problem (defect) records to ensure content completeness of the defect description, problem validity and uniqueness of user input problems;
- reduction in the human and machine resources and wasted time resulting from duplicate reports of existing technical problems, problem descriptions that lack relevant information, problem descriptions containing errors (including those resulting from human error) and the like;
- improvements to the process of software and hardware testing and development;
- automated process for identifying duplicate problems, thereby increasing the processing speed and efficiency of a defect triage process;
- tools for enabling testers to produce better problem descriptions using log data that enables developers to more quickly understand and resolve real problems, increasing the effectiveness and quality of defect resolution;
- tools for automatically reviewing problem descriptions and providing recommendations to improve problem descriptions and improve the overall quality of defect resolution;
- facilitation of the reduction of the quantity of historic data that needs to be maintained for the future in a multi-stage problem triage process; and
- reduction in the need for human resources and the corresponding machine resources by eliminating the need for human intervention in numerous technical problem resolutions.

Generally, an automated multi-stage problem triage process is disclosed, in which information provided by a user regarding a given problem is analyzed, refined, and compared against a corpus of existing problem (defect) records. In example embodiments, an initial defect assessment process is automated to ensure content completeness of the defect description, problem validity, and uniqueness of the user's input problem. Example embodiments reduce the human and machine resources, and the time wasted as a result of duplicate reports of existing technical problems, problem descriptions that lack relevant information, problem descriptions containing errors (including those resulting from human error) and the like.

During a release of a new hardware system and conventional software system, as many as 60% of all submitted defects were eventually determined to be invalid or duplicates of previously submitted defect reports. By leveraging artificial intelligence (AI) systems, an automated triage process is orchestrated that utilizes historical data and a knowledge base of a given problem space. This allows for the automation of highly tedious and experience-demanding work, such as determining the information needed for problem identification, evaluating content semantic similarity, determining operational outcome expectancy, and discerning key details for problem identification.

In conventional defect management solutions and test processes, potential flaws in recognizing defects that may already have been seen and reported in open defect records may exist in the system. When these duplicate defects are created, developers typically need to manually review the duplicate defect as if it were a new valid defect until they can determine that the defect is indeed a duplicate of an existing defect record. During a release of a conventional software system, as many as 60% of all submitted defects were eventually determined to be invalid or duplicates of previously submitted defect reports. Examples of scenarios that result in invalid defects include, but are not limited to:

- defect records created for problems that are known and already have an existing defect (problem) record open;
- defect records created for problems that have been resolved, but where proper service has not been applied; and
- problems (defects) that result from user error or system misconfiguration.

The problem creation process can require back-and-forth communication between testers and developers to ensure that all needed information is collected. For problems that inevitably result in an invalid assessment, this manual time and effort is wasted. Testers end up running test scenarios that are known to fail, collecting information related to a known failure; consume time writing a description of a defect that is covered by an existing defect report; and the like. The developers may read through the same problem multiple times, attempting to link duplicate defects to one another, and answering and asking questions with testers. Process flaws such as these can result in extra unnecessary work and take time away from testing and fixing valid problems.

Content Completeness

In example embodiments, the multi-stage automated problem triage process enables an end user to utilize an AI assistant to work collaboratively through the problem triage and reporting process to ensure completeness and avoid redundant reports. The process begins with an end user providing a description of a problem being experienced, such as a software test problem. The input is then ingested by, for example, a large language model (LLM) specialized in classifying written text; specifically, whether a given defect description has sufficient data based on existing knowledge of historical problem reports and the resulting triage process. If the user input is deemed to be insufficient, the LLM will attempt to identify the key areas on which the user should expand the description. In example embodiments, an LLM is used to generate a complete problem description based on the user-provided problem description. After a synthetic problem description is created, it is compared with the user's problem description to identify areas in the user-provided problem description that need enhancement. In example embodiments, clarifying questions are automatically generated and provided to the user to ensure that the problem description is robust, more complete, and more accurate.

EXAMPLE

User: "I keep hitting an error when performing an insert"

LLM Enhancement: "While performing INSERT INTO <TABLE NAME> VALUES (<USER VALUES>) on my DB2 instance I receive the following error <USER_ERROR_PLACEHOLDER>

DB2 Version= < DB2_VERSION_PLACEHOLDER>"

LLM Comparison Notes: "Users Input seems to be missing specificity on what Database Product they are using. In addition to this, they are missing information on what specific command or action was taken and the resulting error."

LLM User Feed Back: "Please provide additional information about what Database Product you are working with (For example: DB2®, IMS, a conventional document-oriented database program, etc.) along with the version you are currently running. Also, ensure you provide the specific command or function performed, along with the resulting error code seen." (DB2 and IMS are database products available from International Business Machines Corporation, Armonk, NY, USA ("IBM"). IMS/ESA® and DB2® are registered marks of IBM. MongoDB® is a non-limiting example of a document-oriented database program. MongoDB© is a registered mark of Mongodb, Inc. New York, NY, USA)

The user considers the questions and the provided feedback, and determines whether the problem description should be updated or whether the next stage of the triage process can be performed without updating the problem description. Users that choose to revise their problem descriptions can have the updated description reevaluated until either the AI system determines that the description includes enough information to proceed, or the user has no more information that they can provide.

Problem Validity

Once a user has provided a sufficient level of information, the process ensures that the described problem is valid. Validity can be based on a range of conditions, such as ensuring that the problem is not a duplicate of an existing problem, ensuring that the problem description satisfactorily explains the unexpected behavior and the like.

Unexpected Behavior

Unexpected behavior can be described as behavior that occurs as a result of a supported action that yields an outcome that is not by design. Utilizing existing problem records (including problem records that are similar to the user described problem) along with current product documentation, an LLM is tasked with identifying what the expected behavior would be. If the expected behavior aligns with the user's perceived behavior, information can be provided back to the user describing why the user may be experiencing the issue, and possibly giving suggestions to remediate the issue. If the expected behavior determined does not match the user's perceived behavior, additional information can be appended to the defect description providing valuable insight later in the problem determination process.

Uniqueness

Uniqueness in a problem record context refers to problems that describe an issue that does not already have an existing problem record. Leveraging historical defect records, the user input problem description can be compared to the corpus of previously recorded problems through known statistical methods (for example: semantic similarity, term frequency-inverse document frequency (TFIDF) vectorization, and the like). Problems that fall above a user/organizational similarity threshold can then be identified as a similar problem and evaluated in the next step. Given the teachings herein, the skilled artisan will be able to use heuristics to determine the similarity threshold. The threshold may differ for different applications and test initiatives. The threshold for any specific application may be determined via trial and error, and experimentation. In general, the threshold can be set by the user based on performance and accuracy requirements, or existing machine learning techniques can be used to tune the threshold. For example, a user's tolerance for false positives and false negatives typically varies depending on the subject matter and the business criticality. The more historical defects and documentation that are available to be used for comparisons, the more information there is available for an artificial intelligence (AI) or a human expert to make an informed decision (at a trade off in computational cost and speed).

In one or more embodiments, once all similar problems are identified, a cross-comparison process is performed to compare each identified similar problem to the other similar problems to achieve a better understanding of what similarities are permissible. If only one similar problem is identified, a collection of problems that are similar to the uniquely similar problem can be utilized in performing the cross-comparison. The comparison results are weighed by their commonality among the set of existing similar problems to determine what similarities should be discarded for the final uniqueness evaluation. This is done on the premise that a set of existing problems can all be valid even if a majority of the set of documents have elements in common; thus, the similarity is not sufficient enough to classify the user-described problem as a duplicate. This concept can be expanded to patterns of similarities that occur in a majority of the set of similar problems. By the end of this cross-compare operation, if no similarities or pattern of similarities can be identified as being shared between a minor subset (multiple problems that make up less than 50% of the similar problems and the user described problem), then the problem will be verified as a sufficiently unique problem and the user will be advised that the problem warrants having a problem record created.

Example

Five Similar Problems Identified for User input on DB2 Insertion problem.

User Description: I encountered a FATAL_ERROR when performing a DB2 Insert with the following command:

INSERT INTO <TABLE_NAME> VALUES (<USER1 VALUES>)(<USER2 VALUES>)(<USER3 VALUES>)

Similar Problem Evaluation:

```
Problem Similarities = {
    "DB2":[P1,P2,P3,P4,P5]
    "Insert": [P1,P2,P3]
    "Multi Value Insertion" : [P1,P3]
    "Table Does not Exist":[P1]
    "Invalid Schema": [P3]
}
```

Common Trends: All Discuss DB2

Majority Trends: A majority of this set involve DB2 Inserts

Minority Trends: A minority of the problems discuss Multi Value Insertion, but are still valid defects, so they must have some unique differentiator.

P1 and P3 have a unique differentiator in the Errors that they are seeing, “Table Does not Exist” vs “Invalid Schema”, validating the assumption that they must have something setting them apart.

User Problem Unique Differentiator: The user’s problem overlaps with P1 and P3, but is differentiated by the error result, FATAL_ERROR.

Architecture

FIG. 1 is an example workflow for generating a description of a defect report, in accordance with example embodiments. In example embodiments, a user inputs a proposed defect description 220 (operation 218). During a content completeness phase 230, a process is performed to develop a complete defect description. Initially, the defect description 220 is analyzed to determine if the defect description 220 includes an amount of information sufficient to describe the problem based on historical defect data (operation 228).

This can include, for example, determining the typical information that coincides with different problem areas and different components. For example, are all the relevant system components included in the defect description 220, does the language of the defect description 220 coincide with the vocabulary that the developer and/or tester expects, and the like.

A check is then performed to determine if the defect description 220 includes a sufficient amount of information based on historical defect data (completeness; decision block 238). If the defect description 220 does not include a sufficient amount of information (NO branch of decision block 238), a synthetic defect description is generated based on the pending defect description 220 (operation 236) and an evaluation is performed to identify the high-level content difference(s) 232 between the pending defect description (such as the original defect description 220 or the latest updated defect description 222) and the synthetic defect description (operation 234). For example, in issuing a database command, it is determined whether the type of database has been identified in the description, whether the schema has been identified in the description, and the like. In example embodiments, operations 236 and 234 are performed by the same entity or are performed as a combined operation by the same entity. In example embodiments, operations 234 and 236 are performed, either separately or in combination, using a reinforcement trained model(s) that, given two sentences or phrases, identify the differences, the missing aspects, what was added to the updated defect description, and the like. Alternatively, a large language model may be used to perform operation 234, operation 236, or both.

Based on the high-level content difference 232 between the pending defect description and the synthetic defect description, prompts with suggestions of additional information to provide in the defect description are generated and presented to the user (operation 226). Example prompts include “what command were you issuing when the error happened,” “what database was being used” and “were there other events going on in the system?” The prompts prompt the user to perform an updating of the user’s defect description (operation 224) to generate an updated defect description 222, either manually or based on suggestions provided by the model itself, without requiring an intervention by an expert. Operation 228 is then repeated using the updated defect description 222. The iterative loop of the content completeness phase 230 repeats until the defect description is considered complete and not lacking information that could be used to determine the validity, whether it is a duplicate or user error, and so on, or when the user has no additional information to provide, as determined in decision block 238. Completeness is indicated by the YES branch of decision block 238.

In example embodiments, a search, such as a vector database search, is conducted to identify defect reports describing similar defects that exist historically, such as within a specified time frame (operation 240, reached by following connector “A” from the YES branch of decision block 238). For example, the historical defect reports that are most similar to the complete default description may be identified based on a given similarity threshold of a nearest neighbor algorithm. In example embodiments, operation 240 can be based on term frequency, inverse document frequency, semantic similarity, text embedding vector search in a vector database, vector similarity (including using a retrieval augmented generation (RAG) technique), any combination of the foregoing, and the like. Given the teachings herein, the skilled artisan will be able to use heuristics to determine the given similarity threshold. In example embodiments, the given similarity threshold is determined based on experimentation. The given similarity threshold can be set by the user based on performance and/or accuracy needs, or existing machine learning techniques can be used to tune the threshold. For example, a user’s tolerance for false positives and false negatives typically varies depending on the subject matter and business criticality. The more historical defects and documentation that are available for comparison, the more information there is available for an artificial intelligence or a human expert to make an informed decision, with a recognized trade off in computational cost and speed.

A check is performed to determine if a defect report having a similarity above the given similarity threshold is found (decision block 242). If a similar defect report having a similarity above the given similarity threshold is not found (NO branch of decision block 242), a defect report is created based on the latest updated defect report (operation 270). If a similar defect report(s) having a similarity above the given similarity threshold is found (YES branch of decision block 242), the similar defect report(s) 244 is returned and the method proceeds with operation 248 of a comparison phase 246 (follow connector "B").

During operation 248, a check is performed to determine if the count of similar defects identified is equal to one or greater than one (decision block 248). If the count of similar defects identified is equal to one (ONE branch of decision block 248), a search, such as a vector database search, is conducted to identify historical defect reports that are similar to the discovered uniquely similar defect (operation 250). A summary of the similarities and differences of the last updated defect report and the discovered similar defect report is created (operation 254) and provided to the user as a uniquely similar defect differentiation summary 256. The method then proceeds with operation 262.

If the count of similar defects identified is greater than one (MORE THAN ONE branch of decision block 248), a summary of the similarities and differences of the last updated defect report and the discovered similar defect reports is created (operation 258) and provided to the user as defect differentiation summary 260. The defect differentiation summary 260 can be used to create a list of occurrences of common topics and a scale of weights of how similar these defects really are; an assessment is made of how influential the defects are (ruling out the validity of this defect). In example embodiments, operation 258 is performed using an LLM, natural language processing routines, or deep neural networks that are focused on identifying key concepts and themes in sentences and the like.

In example embodiments, the similarities that are unnecessary (in terms of uniquely identifying a defect) are assessed and the validity of the defect is identified (operations 262-264). Similarities of topics and the like that are the same across all similar defects are discarded as, for example, they are not sole identifiers of the defect (operation 262). In essence, the difference(s) in problems (defects) that are similar are identified such that the differences can be used to help determine if the problems are unique; that is, the discriminating features and topics that are present in the defect are isolated. What makes the defect truly unique is isolated by discarding the unnecessary elements in the assessment. If all similarities are discarded, then it is likely that not enough information was provided in the original defect description (hence, the initial effort to improve defect description robustness at the start of the process). If similarities remain because a minor subset of similar documents remain, then it is known that these are a key differentiating feature(s) among the other similar documents; as a result, this increases the overlap with the minor subset. As a result, the smallest set of elements that the defect overlaps with (in terms of other defects) is determined; specifically, the topic/elements that are the least prevalent in the original similar document set.

(It is noted that, if there are multiple existing defect reports that all have a trait in common with the user defect description, then those common elements are not a sole identifier for a defect being valid or not. Thus, for example, a historical defect that was deemed valid may not be rejected even though, for example, both defect A and defect B discussed the same conventional database.) Whether the remaining similarities are outweighed by the differences between the user-described defect and the similar existing defects is assessed (for example, whether they contribute to a large enough weight of difference that the defect is valid or not; that is, a kind of mathematical operation is performed to add weight based on occurrence; operation 264). This can be based, for example, on a user-defined threshold, a machine learning generated threshold, and the like. Given the teachings herein, the skilled artisan will be able to use heuristics to determine the given threshold. In example embodiments, the threshold is determined based on experimentation. In example embodiments, the threshold is determined via machine learning where a past similar test uses a large language model (LLM) to examine duplicate problems and determine the threshold. Similarities that are sufficiently frequent across the set of similar documents, such that they cannot be solely relied upon for rejection of a defect as being a duplicate, stand for single overlapping factors and patterns of overlapping factors. Due to the desired flexibility in the disclosed approach, this threshold is dependent on the data. For example, consider the case where all of the defects contain 80% of the content in common and the remaining 20% of the content being critical for problem identification. If the threshold is at 80%, virtually every defect will be flagged. In this situation, a threshold of 95% similarity may be more appropriate for identifying true duplicates. Thus, a statistical model where the weights are manually set by searching for defect reports that are within 80% of the nearest matches utilizes a threshold that is not high enough to be considered a reasonable or a discarding factor.

The remaining similarities and differences are assessed based, for example, on a statistical model. For example, assume there are five similarities with existing defects and ten remaining distinguishing key points. If over half of the set of themes discussed in the defect can be considered nonexistent (there is no other document that represents that combination of topics) or are unique, this can be considered sufficient to proceed with writing a defect and having an actual expert evaluate the defect report. A reinforcement learning model or a deep neural network can be trained to discriminate based on different factors of input, such as themes, discussion topics and, if they exist, the frequency.

Following connector "C," in example embodiments, a check is performed to determine if the differences outweigh the similarities (decision block 266). If the differences outweigh the similarities (YES branch of decision block 266), the workflow proceeds with creating the defect report (operation 270).

If the differences do not outweigh the similarities (NO branch of decision block 266), the workflow proceeds with advising the user to refrain from opening the defect report (operation 268) and the method ends. In example embodiments, some of the information (such as similar defect reports or the information describing the similarities and/or differences of the descriptions) that was generated can be provided to the user. In example embodiments, showing the user a list of all existing defects might possibly constitute a security breach. In this case, returning the similarities is not performed or the similarities are just appended to an existing defect report as a duplicate.

Returning to operation 262, similar to discarding similarities (but instead of using existing defects to rule out multiple defects at the same topics), if only one defect exists, a summary is created for that existing defect and for any defects that are similar to the existing defect. Thus, similar to finding defects similar to the original defect description

220, defects that are similar to this uniquely similar defect are searched for. This can generate a list of multiple similar defects, even if they are not within some useful range.

One or more embodiments advantageously significantly reduce the amount of unnecessary work that a development team undertakes in reviewing problems that are duplicates of existing problems. For example, if a system under test produces 1000 problems, 60% of which are duplicates, and if a duplicate takes 3 hours on average to recognize as a duplicate and close, then that represents 600 duplicate problems X 3 hours=1800 hours or 75 days or person-days of unnecessary work. By significantly reducing duplicates, one or more embodiments advantageously allow developer to focus on actual problems that need to be fixed, which in turn allows testing to be completed weeks, if not months, sooner than in the prior art.

Figure 2:
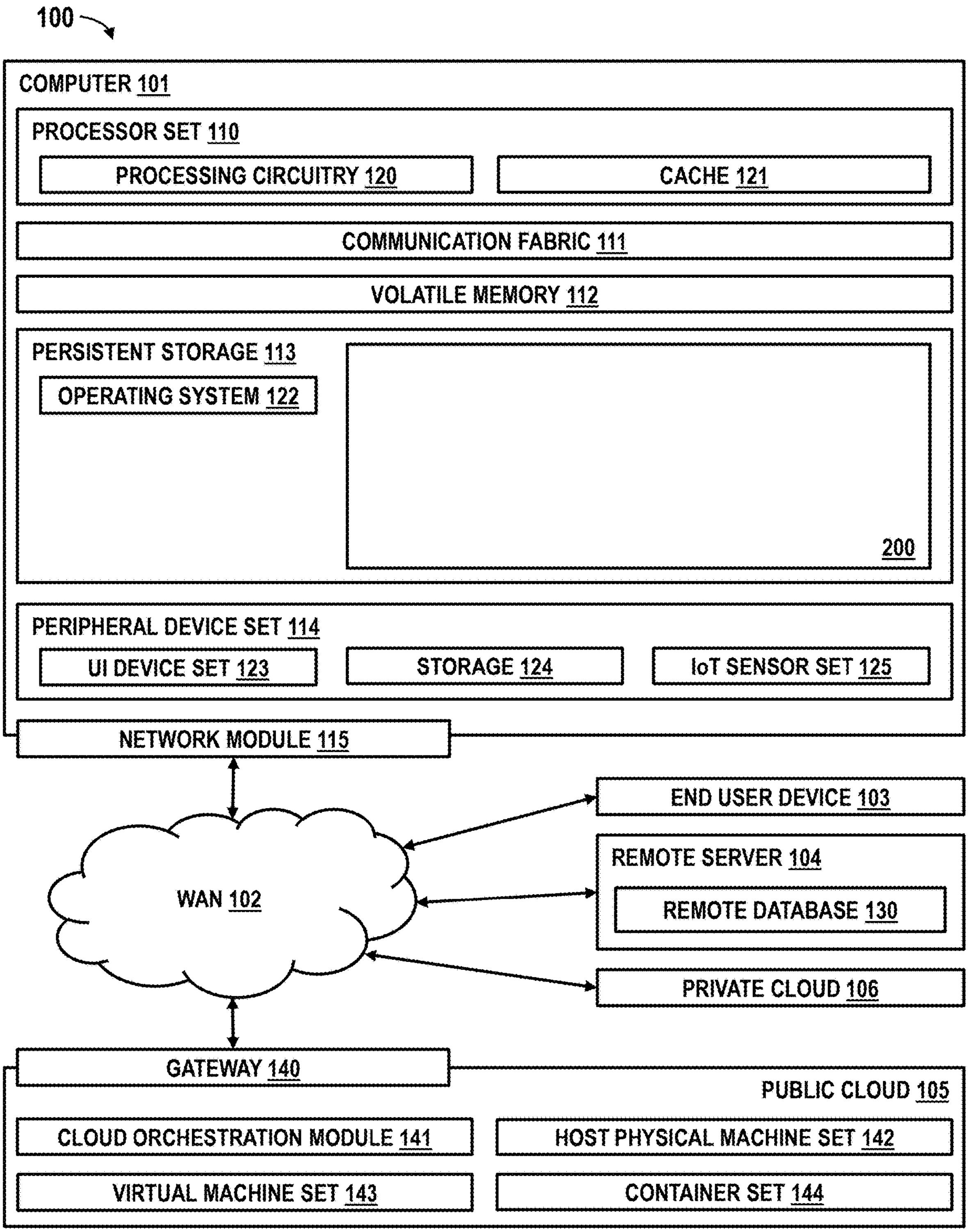
FIG. 2 depicts a computing environment according to an embodiment of the present invention.

Refer now to FIG. 2.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Computing environment 100 contains an example of an environment for the execution of at least some of the computer code involved in performing the inventive methods, such as problem triage system 200. In addition to block 200, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 200, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 2. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 200 in persistent storage 113.

COMMUNICATION FABRIC 111 is the signal conduction path that allows the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface-type operating systems that employ a kernel. The code included in block 200 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method comprising:

obtaining a proposed defect description;

analyzing the proposed defect description to determine whether the proposed defect description includes an amount of information sufficient to describe a corresponding problem based on historical defect data, wherein the amount of information is sufficient to describe the corresponding problem when all relevant system components are included;

responsive to a result of the analyzing, conducting a search to identify one or more database defect reports describing similar defects recorded in a database;

performing a check to determine if a similar defect report having a similarity above a given similarity threshold is found; and creating a final defect report based on a latest updated defect report in response to the latest updated defect report being unique.

2. The method of claim 1, wherein the search is a vector database search.

3. The method of claim 1, further comprising conducting a content completeness phase, wherein the conducting the search to identify the one or more database defect reports is based on a latest updated defect description generated by the content completeness phase.

4. The method of claim 1, further comprising performing a check to determine a count of similar defects in response to finding the similar defect report having the similarity above the given similarity threshold during a subsequent iteration of the method.

5. The method of claim 4, further comprising creating a defect differentiation summary of similarities and differences of the latest updated defect report and the similar defect reports, and providing the defect differentiation summary to a user in response to the count of similar defects being greater than one.

6. The method of claim 5, further comprising assessing the similarities, discarding a set of the similarities that are included in all of the similar defect reports and identifying a validity of the latest updated defect report.

7. The method of claim 6, further comprising assessing remaining similarities and differences based on a statistical model in response to the assessing the similarities.

8. The method of claim 6, further comprising:

assessing whether remaining similarities are outweighed by the differences between the latest updated defect report and the similar database defect reports in response to the assessing the similarities; and performing a check to determine if the differences outweigh the similarities.

9. The method of claim 8, further comprising creating the final defect report in response to the differences outweighing the similarities.

10. The method of claim 8, further comprising advising a user to refrain from opening the defect report in response to the similarities outweighing the differences.

11. The method of claim 10, further comprising providing a portion of information describing the similarities and the differences to the user.

12. The method of claim 4, further comprising conducting a search to identify given defect reports of the one or more database defect reports that describe defects similar to the single similar defect, in response to the count of similar defects being equal to one.

13. The method of claim 12, wherein the search to identify the one or more database defect reports that describe defects similar to the single similar defect is based on a specified time frame.

14. The method of claim 12, further comprising creating a summary of the similarities and differences of the latest updated defect report and the single similar defect report, and providing to a user as a uniquely similar defect differentiation summary.

15. The method of claim 1, further comprising:

performing a check to determine if the proposed defect description includes the sufficient amount of information based on the historical defect data, wherein the conducting the search is performed based on a result of the check.

16. The method of claim 15, further comprising:

generating a synthetic updated defect description based on the latest updated defect description or the proposed defect description in response to the latest updated defect description or the proposed defect description not including the sufficient amount of information;

performing an evaluation to identify one or more high-level content differences between the synthetic updated defect description and one of the latest updated defect description and the proposed defect description;

generating prompts describing suggestions of additional information to provide in the final defect report based on the one or more high-level content differences; and prompting a user to perform an updating of the proposed defect description or the latest updated defect description.

17. The method of claim 3, further comprising repeating iterative loop of the content completeness phase until the latest updated defect description is considered complete or a user has added all available relevant information.

18. A method comprising:

obtaining a proposed defect description;

conducting a search to identify one or more database defect reports describing similar defects recorded in a database;

analyzing the proposed defect description to determine whether the proposed defect description includes an amount of information sufficient to describe a corresponding problem based on historical defect data;

performing a check to determine if the proposed defect description includes a sufficient amount of information based on the historical defect data, wherein the conducting of the search is performed based on a result of the check;

generating a synthetic updated defect description based on a latest updated defect description or the proposed defect description in response to the latest updated defect description or the proposed defect description not including a sufficient amount of information;

performing an evaluation to identify one or more high-level content differences between the synthetic updated defect description and one of the latest updated defect description and the proposed defect description;

generating prompts describing suggestions of additional information to provide in a final defect report based on the one or more high-level content differences; and prompting a user to perform an updating of the proposed defect description or the latest updated defect description.

19. The method of claim 18, further comprising:

obtaining an updated defect description; and repeating the analyzing the proposed defect description to determine whether the proposed defect description includes the amount of information sufficient to describe the corresponding problem based on the historical defect data.

20. A system comprising:

a memory; and at least one processor, coupled to said memory, and operative to perform operations comprising:

obtaining a proposed defect description;

analyzing the proposed defect description to determine whether the proposed defect description includes an amount of information sufficient to describe a corresponding problem based on historical defect data, wherein the amount of information is sufficient to describe the corresponding problem when all relevant system components are included;

responsive to a result of the analyzing, conducting a search to identify one or more database defect reports describing similar defects recorded in a database;

performing a check to determine if a similar defect report having a similarity above a given similarity threshold is found; and creating a final defect report based on a latest updated defect report in response to the latest updated defect report being unique.

21. A computer program product, comprising:

one or more tangible computer-readable storage media and program instructions stored on at least one of the one or more tangible computer-readable storage media, the program instructions executable by a processor, the program instructions comprising:

obtaining a proposed defect description;

conducting a search to identify one or more database defect reports describing similar defects recorded in a database;

analyzing the proposed defect description to determine whether the proposed defect description includes an amount of information sufficient to describe a corresponding problem based on historical defect data;

performing a check to determine if the proposed defect description includes a sufficient amount of information based on the historical defect data, wherein the conducting of the search is performed based on a result of the check;

generating a synthetic updated defect description based on a latest updated defect description or the proposed defect description in response to the latest updated defect description or the proposed defect description not including a sufficient amount of information;

performing an evaluation to identify one or more high-level content differences between the synthetic updated defect description and one of the latest updated defect description and the proposed defect description;

generating prompts describing suggestions of additional information to provide in a final defect report based on the one or more high-level content differences; and prompting a user to perform an updating of the proposed defect description or the latest updated defect description.

22. A system comprising:

a memory; and at least one processor, coupled to said memory, and operative to perform operations comprising:

obtaining a proposed defect description;

conducting a search to identify one or more database defect reports describing similar defects recorded in a database;

analyzing the proposed defect description to determine whether the proposed defect description includes an amount of information sufficient to describe a corresponding problem based on historical defect data;

performing a check to determine if the proposed defect description includes a sufficient amount of information based on the historical defect data, wherein the conducting of the search is performed based on a result of the check;

generating a synthetic updated defect description based on a latest updated defect description or the proposed defect description in response to the latest updated defect description or the proposed defect description not including a sufficient amount of information;

performing an evaluation to identify one or more high-level content differences between the synthetic updated defect description and one of the latest updated defect description and the proposed defect description;

generating prompts describing suggestions of additional information to provide in a final defect report based on the one or more high-level content differences; and prompting a user to perform an updating of the proposed defect description or the latest updated defect description.

23. The system of claim 22, the operations further comprising conducting a content completeness phase, wherein the conducting the search to identify the one or more database defect reports is based on a latest updated defect description generated by the content completeness phase.

24. The system of claim 22, the operations further comprising performing a check to determine a count of similar defects in response to finding the similar defect report having the similarity above the given similarity threshold during a subsequent iteration of the operations.

* * * * *